United States Patent [19]

Huber

[11] Patent Number: 5,343,645
[45] Date of Patent: Sep. 6, 1994

[54] MULTI-FACETED DISPLAY DRIVE MECHANISM

[75] Inventor: Mortimer J. Huber, St. Paul, Minn.

[73] Assignee: Quality Manufacturing Incorporated, St. Paul, Minn.

[21] Appl. No.: 839,250

[22] Filed: Feb. 20, 1992

[51] Int. Cl.$^5$ .................. G09F 11/02; F16H 35/02
[52] U.S. Cl. ........................... 40/505; 74/393; 74/665 GE; 474/112
[58] Field of Search .............. 40/470, 503, 505; 74/393, 665 GE; 474/112, 133, 134

[56] References Cited

U.S. PATENT DOCUMENTS

| | | |
|---|---|---|
| 666,524 | 1/1981 | Hopewell . |
| 1,461,047 | 7/1923 | Ray . |
| 1,781,625 | 6/1929 | Bartoletti . |
| 1,785,204 | 12/1930 | Nelson et al. ............. 40/505 |
| 2,277,323 | 3/1942 | Hjermstad et al. . |
| 2,360,780 | 10/1944 | McCarty et al. . |
| 2,839,855 | 6/1958 | Palmer et al. . |
| 3,234,674 | 2/1966 | Simoneau ............. 40/505 |
| 3,335,513 | 8/1967 | Mann . |
| 3,675,503 | 7/1972 | Upadhyay . |
| 3,921,321 | 11/1975 | Weisskopf . |
| 4,189,859 | 2/1980 | Ahlgren ............. 40/505 |
| 4,537,087 | 8/1985 | Faitel . |
| 4,638,580 | 1/1987 | Giannetti et al. ............. 40/503 |
| 4,756,203 | 7/1988 | Matsuda . |
| 4,759,140 | 7/1988 | Roberts et al. ............. 40/466 |
| 4,796,478 | 1/1989 | Carson ............. 74/393 X |
| 4,987,691 | 1/1991 | Kessels et al. ............. 40/506 |
| 5,233,772 | 8/1993 | Bergeron et al. ............. 40/505 X |

FOREIGN PATENT DOCUMENTS

| | | | |
|---|---|---|---|
| 240683 | 9/1990 | Japan ............. | 40/503 |
| 1166931 | 10/1969 | United Kingdom ............. | 40/503 |

Primary Examiner—Kenneth J. Dorner
Assistant Examiner—J. Bonifanti
Attorney, Agent, or Firm—Merchant, Gould, Smith, Edell, Welter & Schmidt

[57] ABSTRACT

A variable speed drive mechanism (4) is disclosed for use in conjunction with multi-sided prismatic convertible sign elements (22). A drive gear (32) driven at constant speed causes a mounting gear (23) to rotate at an angular velocity both slower than the angular velocity of the drive gear (32) and at a varying angular velocity. An idler gear (38) guides a flexible tension supporting element (31) as it travels between an equalizer gear (35) and the drive gear (32). A series of the drive trains (21) may be mounted adjacent to each other so as to permit a plurality of prismatic sign elements (22, 47, 48) to create a convertible sign.

13 Claims, 5 Drawing Sheets

MULTI-FACETED DISPLAY DRIVE MECHANISM

BACKGROUND OF THE INVENTION

1. Field of the Invention

The present invention relates to a variable speed rotary drive mechanism. More specifically, the present invention includes a drive mechanism useful in operating prismatic display sign elements so as to vary the speed of rotation from a maximum velocity occurring during the changing of display surfaces to a minimum velocity occurring as the position corresponding to the display of the desired surface is approached.

2. Description of Related Technology

There are several known kinds of convertible signs, one type of which creates a display arrangement comprising prisms, each of which are mounted at opposite longitudinal ends and rotatable about their longitudinal axis. Each prism is part of an equal sequence in a frame, the prisms residing beside each other. The sides of the prism are oriented in a permanently occurring sequence forming a number of displays corresponding to the number of side surfaces of the single prism. Such a sign necessarily includes a drive motor for synchronous rotation of the prisms via a transmission.

Displays of this type usually comprise triangular aluminum prisms, which rotate in an aluminum frame and within 15 seconds show three displays in a permanently recurring sequence. The prisms can be dismounted and exchanged. Due to the triangular shape of the prisms, three different views can be shown. The display arrangement can be mounted with its frame standing free, on walls or on roofs of buildings.

Known display arrangements of this type are typically driven by an electric motor, and the prisms are rotated synchronously by a gear transmission in such a manner that the sides of the respective prisms belonging to the same picture are shown simultaneously and form a display. The gear transmission ensures synchronous rotation of each prism.

A gear transmission, however, involves certain disadvantages. A desirable characteristic of most convertible signs is that they operate noiselessly, particularly when the displays are mounted on buildings. A gear transmission for operating noiselessly requires good lubrication. This requirement would be difficult to attend to at many sign locations, because of the need for periodic service and such signs in most cases are positioned in places of difficult access. The problem of access has created a need for mechanisms of high durability and reliability, along with the continuing requirement for accurate registration of the sign elements and the constant need to start, rotate and stop the sign display. Experience in the field has demonstrated the need to convert this inherently complex mechanical operation into one having as much reliability and simplicity as possible.

One approach has been to opt for the relative simplicity and reliability of rotary motion, yet to ensure accurate registration of the sign elements by utilizing some sort of reciprocating element defining absolute limits of travel coincident with proper sign element registration. For example, U.S. Pat. No. 606,524, issued to Hopewell discloses reciprocating rods or bars which attach at one end to a drum or cylinder and at the other end to a peripheral area of a prismatic member. The periodic rotation of the cylinder causes the rods to physically push or pull an edge of each prismatic member, thereby causing each member to rotate about its longitudinal axis.

U.S. Pat. No. 1,718,625, issued to Bartoletti, discloses a rotary motor coupled to a reciprocating bar which in turn drives a bell crank attached to a ratcheting mechanism. The ratchet, or rack gear arrangement periodically rotates triangular members through 120° of travel.

U.S. Pat. No. 2,360,780, issued to McCarty et al., discloses a rotating disk attached to an eccentrically mounted pin, each rotation of the disk causing a 90° rotation of a rectangular sign face member.

U.S. Pat. No. 3,335,513, issued to Mann, discloses a hydraulic system which converts rotary to reciprocating motion.

U.S. Pat. No. 4,537,087, utilizes a pin mounted to a moving chain to travel within a slot on a pivotable arm. As the pin reciprocates within the slot, a rotary motion is imparted to the pivotable arm which thereby drives an output shaft at variable speed.

Other examples of belt or chain drives are disclosed in U.S. Pat. No. 4,759,140, issued to Roberts et al., in which a linear drive magnetic motor causes a belt to reciprocate between two positions, thereby rotating display panels through 180°. Also, U.S. Pat. No. 4,987,691, issued to Kessels et al., discloses a belt drive for triangular sign face members using a belt drive which is linked to each prismatic member by means of a flexible metallic gripping member which frictionally engages the corner of each prismatic member so as to cause rotation of the prismatic member through an angle of 120°.

All of the aforementioned devices suffer from considerable mechanical complexity leading to substantial wear, parts failure, need for lubrication, and other preventive and periodic maintenance. A simpler solution from a mechanical standpoint is to limit the mechanical linkages solely to rotary motion, thereby avoiding the complexity of converting reciprocating motion to rotary motion and vice versa.

For example, U.S. Pat. No. 1,461,047, issued to Ray, uses a bevel gear attached to a motor to drive a mating bevel gear at the bottom of each triangular member. There are circumferential gaps in the teeth of the driving bevel gear, thereby causing the driven triangular member to stop periodically during the rotation of the driving gear.

U.S. Pat. No. 2,277,323, issued to Hjermstad et al., discloses a bevel gear arrangement in which the driving gear is activated periodically by cams connected to the output shaft of a motor. The 120° spacing of the cams causes the triangular sign member to rotate through 120° as well.

U.S. Pat. No. 2,839,855, issued to Palmer et al., discloses a two-sided sign in which a cam activates a mating lever for every 180° of driving motor shaft rotation. A spring restrains the lever to a registered position when not driven by the cam member. The force of the motor and the driving cam is sufficient to overcome the resistance of the spring and permit another 180° increment of sign rotation.

U.S. Pat. No. 4,638,580, issued to Giannetti et al., also discloses angularly spaced cams placed at 120° intervals along a driving shaft which interact with mating pins on the driven shaft which is in turn connected to the triangular sign face members.

Specialized gears have been adapted to convertible sign applications, most notable among them being the so-called "Geneva" gear. A Geneva gear is a gear that normally includes a plurality of radially extending slots that coact with a pin or finger mechanism that is moved by another part of the mechanical system. As the pin coacts with one of the driving slots, the Geneva gear is rotated through a predetermined arc. Thereafter, a second driving slot coacts with the pin mechanism to rotate the Geneva gear through a second arc. The Geneva gear is stationary between rotational movement periods, which is ideal for a convertible sign application. An example of a Geneva gear device is disclosed in U.S. Pat. No. 3,675,503, issued to Upadhyay.

Another specialized gear, the "Maltese cross" and gear arrangement, has also been adapted to convertible signs, as disclosed in U.S. Pat. No. 3,921,321, issued to Weisskopf. Another type of indexing gear is utilized in U.S. Pat. No. 4,189,859, issued to Ahlgren, for a convertible sign application.

A typical problem of the aforementioned devices is undesired shock at the beginning and end of the motion. This is a particular problem with convertible signs which are often heavy and yet must stop and start several times each minute. One attempt to solve this problem is disclosed in U.S. Pat. No. 4,756,203, issued to Matsuda, which discloses a drive mechanism using a non-circular drive gear and elliptical cam.

SUMMARY OF THE INVENTION

The present invention attempts to address some of the problems present in prior art devices used for operating convertible signs. In particular, the present invention addresses the problem of rotating a sign face member while avoiding the shock of braking, starting and stopping again while minimizing wear on the mechanism itself. Additionally, the device should be as simple as possible, without the need for excessive maintenance or specially machined parts.

Accordingly, the present invention includes a drive mechanism designed to rotate a sign face member through successive 120° turns. Ideally, the turn itself should be accomplished as rapidly as possible, since no intelligence is being conveyed to the sign reader while the sign is actually turning. On the other hand, a rapid turn necessitates high torque requirements at both the starting and stopping point of each cycle. Therefore, the present invention begins rotating the sign at a relatively low rate, such as 15 revolutions per minute, yet halfway through the turn, that is, at the point of approximately 60° of angular rotation, the rate of rotation is increased by several fold, for example, to approximately 60 revolutions per minute. The drive train of the present invention then decelerates such that at or near the 120° rotation point, the rate of rotation has been reduced again to its original value.

Whereas the elapsed time for rotation at 15 revolutions per minute may have approximated 4 seconds, with the present invention the average speed can be increased to 37½ rpm and reduce the travel time to 1.5 seconds.

The present invention includes a chain driven gear drive system, including off-center gear elements. The drive train itself represents a completely mechanical solution to the stated problem of providing rapid travel times inserted between long residence times for the displayed information.

The same goal could be achieved by either electrical or hydraulic means. For example, an electrical solution would include a drive train driven by a variable speed motor. The variable speed motor would be coupled to a programmable voltage control which would drive the drive train at the lower desired revolution rate occurring at the beginning of the 120° rotation period, gradually increasing the voltage necessary to drive the motor at a high revolution rate during the mid-region of the rotation period. The power can then be interrupted by electrical contacts on the drive train, turning off the power source completely and activating an electrical brake connected to the power source in order to keep the prisms properly registered in their display configuration. The timer then reactivates the power source, thereby turning the prism from the original display to the next sequential display. The timer may be programmed to display each sign face equally, or to display one sign face for longer periods than the others.

While either the mechanical or the electrical solution may be used alone, they may be advantageously combined to provide enhanced operation. Thus, while the mechanical drive train is increasing the revolution rate during the midpoint of the 120° turn, a variable speed motor could also be increasing its shaft output rotation rate simultaneously, thereby further increasing the rotation speed during the midpoint at the 120 rotation cycle.

DETAILED DESCRIPTION OF THE PREFERRED EMBODIMENTS

Figure 1:
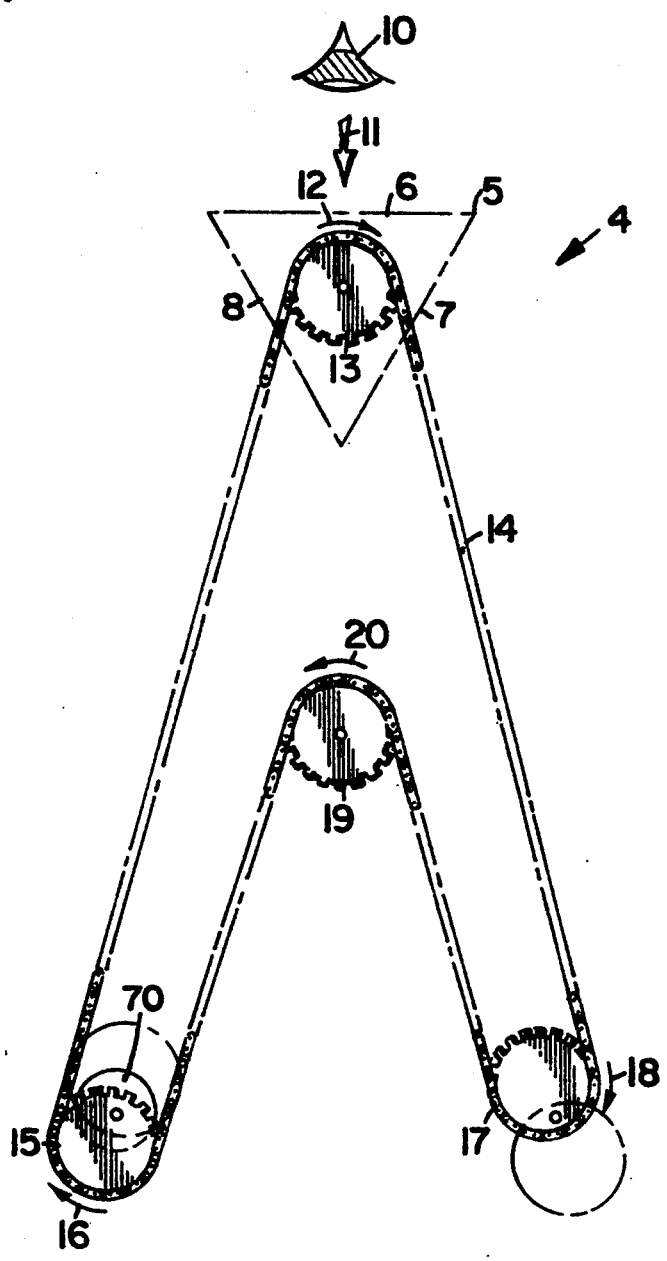
FIG. 1 is a schematic plan view showing the principles of the present invention.
Figure 8:
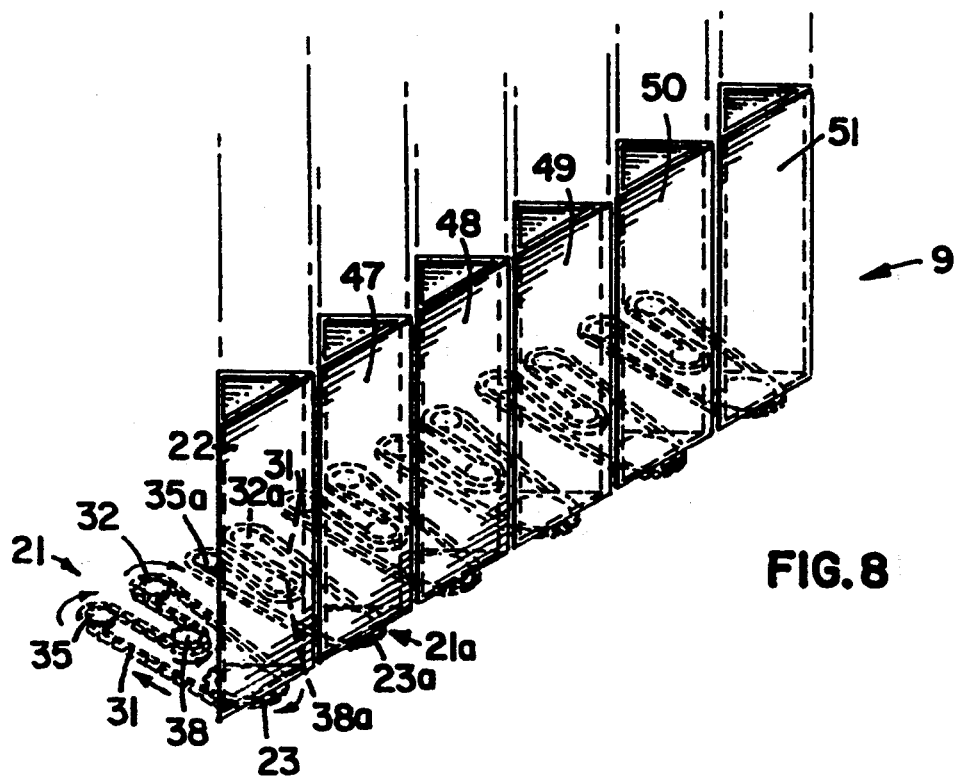
FIG. 8 is a perspective view showing how the device of FIG. 1 may be combined to produce a multi-paneled convertible sign.

Referring to FIG. 1, a device built according to the principles of the present invention is shown generally at 4. The device includes a multifaceted prismatic display member 5, which may have any number of sides, but in this example is shown to be three-sided. The three sides 6, 7 and 8 typically contain different information, and are typically ganged or combined together with similar panels to form a completed sign 9 as shown in FIG. 8.

As seen in FIG. 1, side 6 is visible to the viewer's eye 10 as the viewer looks generally in direction 11. As the member 5 rotates in the direction shown by arrow 12, side 8 will come into view followed by side 7. Side member 5 is mounted on sign gear 13 which is driven by chain 14.

A motor 70 activates drive gear 15 which rotates in the direction of arrow 16. As chain 14 travels around gear 15, it next encounters sign gear 13 and continues traveling around equalizer gear 17 which is rotating in the direction shown by arrow 18. Chain 14 next encounters idler gear 19 which rotates in the direction shown by arrow 20, the chain next encountering drive gear 15 to form a complete closed chain system. Although gears 13, 15, 17 and 19 are shown to be of approximately the same diameter, in practice the gear dimensions and mounting arrangements may be chosen to provide the ratios desired for rotating member 5. While gears 13 and 19 are mounted so as to rotate about their respective centers, gears 17 and 15 are mounted so as to rotate about a point substantially offset from the center and near the periphery of each respective gear. Depending on the geometry chosen, the application of a rotational mode of force to gear 15 may cause member 5 to rotate at a uniform rate, or at a rate which varies throughout a complete 360° cycle. Ideally, for a three-sided member 5, the geometry should be chosen such that variations in angular velocity vary over 120°, whereas a four-sided member 5, for example, would require a complete cyclical variation in angular velocity to occur every 90°.

Figure 2:
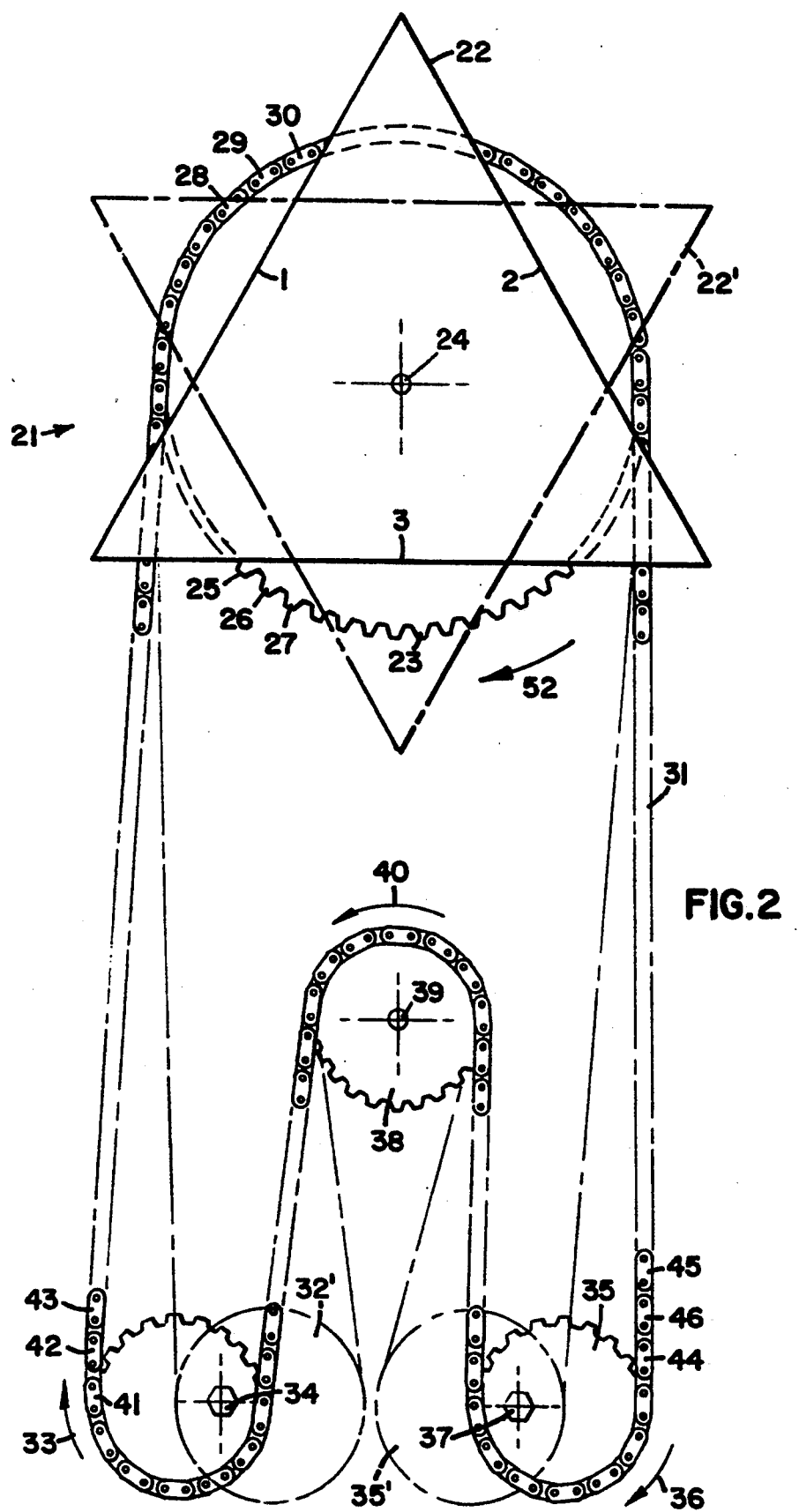
FIG. 2 is a plan view of a preferred embodiment of the device depicted in FIG. 1 showing alternate positions of the elements as the device is operated.

Referring to FIG. 2, a specific embodiment of the present invention as applied to a three-faced sign element member is shown at 21. A sign member 22 is shown in a first position while sign member 22' is the same member shown at a second position. Typically, sign face 1 is oriented so as to be in a position in which its intelligence can be viewed, usually in association with adjacent sign face members, by the consumer. Sign faces 2 and 3 would be hidden from view. Sign member 22 is mounted on mounting gear 23, which rotates about its center 24. A number of gear teeth 25, 26, 27, etc., are spaced about the periphery of gear 23 and interact with sprockets 28, 29, 30, etc. on chain 31. Drive gear 32 is driven by a motor (not shown) and rotates in the direction shown by arrow 33. Drive gear 32 is mounted off center and rotates about point 34.

As gear 32 rotates, chain 31 passes around the periphery of gear 23, rotating sign element 22 in the direction shown by arrow 52. Chain 31 next passes around equalizer gear 35. Gear 35 rotates in the direction shown by arrow 36. Gear 35 is mounted off center and rotates about point 37.

Chain 31 next passes to idler gear 38 which rotates about its center 39 and rotates in the direction shown by arrow 40. Chain 31 completes its path by returning to drive gear 32.

As shown in FIG. 2, when drive gear 32 is in the position shown, and rotates in the direction of arrow 33, the sprockets, for example, 41, 42, 43, etc. are traveling in the direction of arrow 33 toward member 22 not only due to the rotation of member 32, but also due to the translation of member 32 about point 34. Similarly, sprockets 44, 45, 46, etc. which are adjacent to equalizer gear 35 are traveling in the direction of arrow 36 and away from member 22 not only due to the rotation of gear 35 in the direction of arrow 36, but also due to the translation of the periphery of gear 35 about point 37. If the periphery near sprocket 41 of gear 32 is also traveling upward due to translational motion, then the effect of the rotation of gear 32 is maximized, that is, movement caused by tension in the chain is maximized since the sprockets of chain 31 are being accelerated by the complimentary translation and rotation of gear 32. Similarly, sprocket 44 is being translated downward to engage gear 35 as gear 35 rotates in the direction of gear 36. Thus, at this point, the velocity of chain 31 as it passes around mounting gear 23 must be at a maximum, due to the complimentary effect of both the translation and rotation of both gears 32 and 35.

When the sign element is at position 22', the drive gear is shown at position 32' and the equalizer gear is shown at position 35'. At this point, the velocity of the chain 31 is minimum and the element 22' is rotating in the direction of arrow 52 at a minimum speed. This is consistent with having sign element 22 rotating at maximum speed in between those periods during which information on the sign faces 1, 2, and 3 is being displayed.

Figure 5:
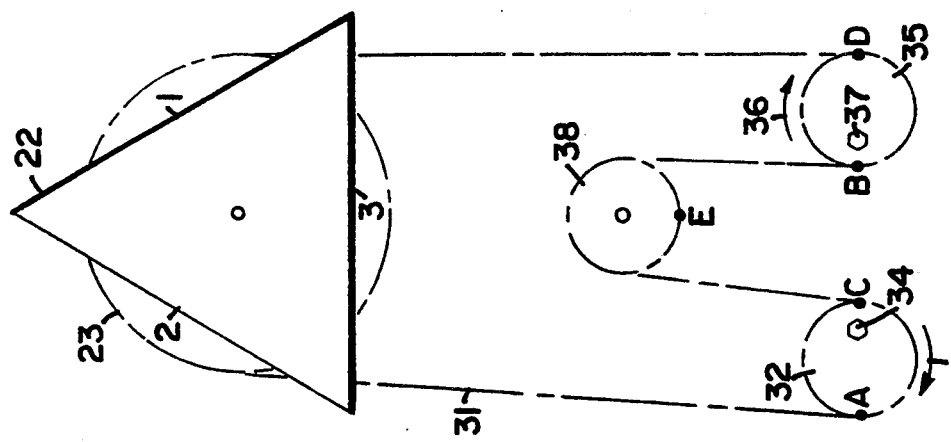
FIG. 5 is a schematic plan view of the device of FIG. 1 shown in a third position.
Figure 3:
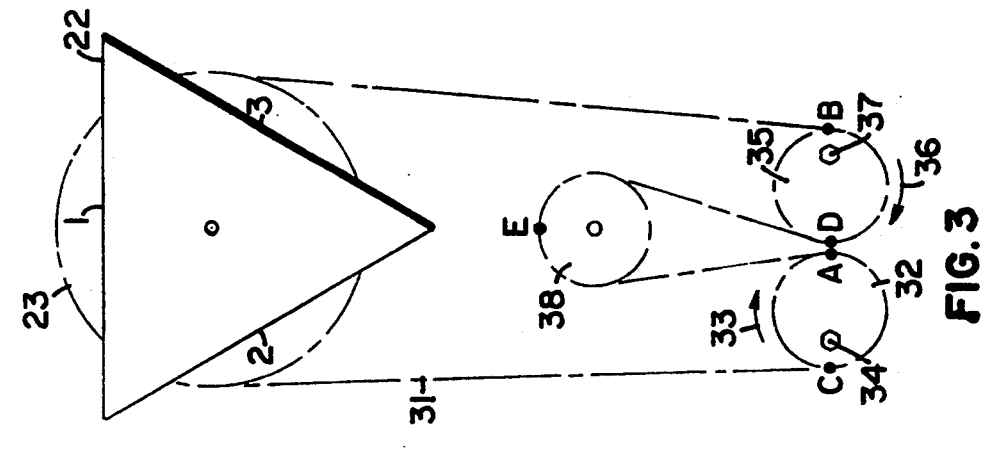
FIG. 3 is a schematic plan view of the device of FIG. 1 shown in a first position.
Figure 7:
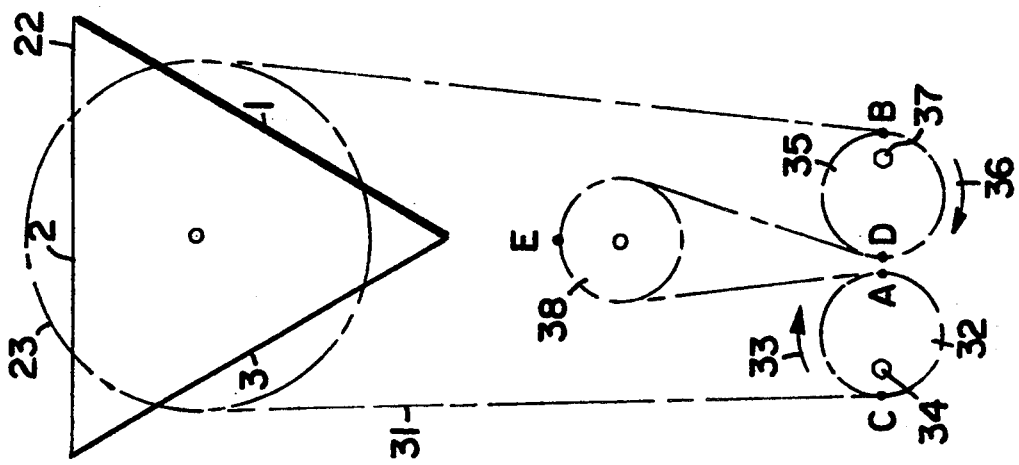
FIG. 7 is a schematic plan view showing the device depicted in FIG. 1 occupying a fifth position.

The entire sequence is best understood by referring to FIGS. 3–7, in which FIG. 5 represents the maximum speed (32, 35) configuration and FIGS. 3 and 7 represent the low speed (32', 35') configuration.

FIGS. 3–7 show sign member 22 at different points throughout its 120° rotation, with emphasis on the relative position of the drive and equalizer gears at successive 90° intervals of rotation of the gears. As those skilled in the art can appreciate, the relative diameters of gears 32, 35 and 23 are chosen so that a motor (not shown) operating at relatively high speed can activate drive gear 32 while causing mounting gear 23 to rotate at a relatively slower speed.

As seen in FIG. 3, the speed of chain 31, and hence the angular velocity of member 22, is at a minimum, since the "high speed" perimeter (point A) is translating in the opposite direction as the direction of the portion of chain 31 which imparts movement to gear 23, while the "low speed" perimeter (point C) is moving in the same direction as the portion of chain 31 which imparts movement to gear 23. The "high speed" perimeter is so named because the lever arm between point A and center 34 is relatively great, causing a large displacement of point A for a given angular rotation of gear 32, while the "low speed" perimeter (point C) is displaced by the relatively smaller lever arm between point C and center 34 for the same given angular rotation of gear 32.

This configuration causes gear 23 to move at minimum speed, coincident with the display period of sign face 1. This, for example, might typically correspond to an angular velocity of sign element 22 of approximately 5 to 15 revolutions per minute. At this point, the sign may be either stopped completely by interacting with the programmable voltage control motor, for example, or may continue to operate causing the sign to merely hesitate at the display position rather than come to a complete stop.

Figure 4:
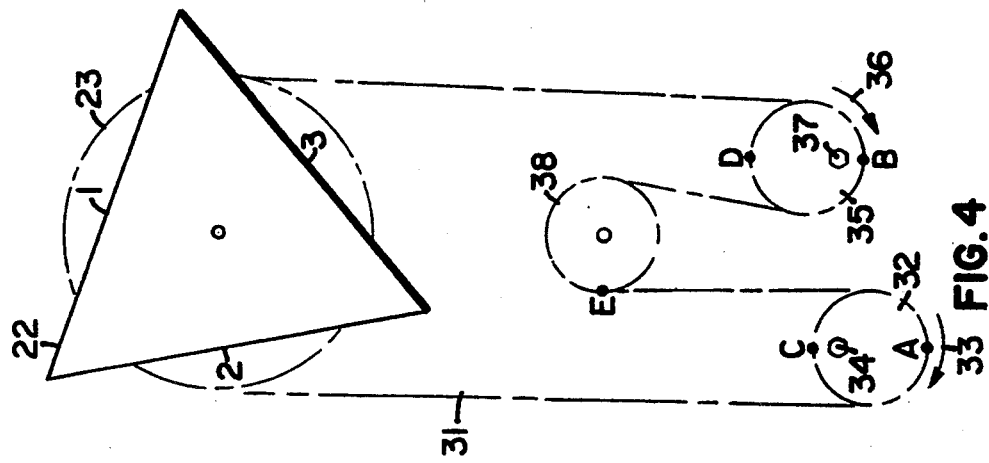
FIG. 4 is a schematic plan view of the device of FIG. 1 shown in a second position.

Referring to FIG. 4, point D of equalizer gear 35, as viewed approximately 90° later, has translated upwardly, while the peripheral region of gear 32 as seen at point A has translated downwardly. Thus, chain 31 is in a position to begin its transition from a minimum velocity to a higher velocity since the relatively constant rotation of elements 32 and 35 is becoming complimentary or additive to the rotation of regions on the perimeter of these gears having the greatest or longest lever arms for translational motion. Note that while gear 32 has advanced through 90° of its cycle, sign element 22 has rotated only approximately 10° to 20°.

Referring to FIG. 5, the midpoint in the maximum velocity phase of element 22 can be appreciated. As can be seen by viewing point A of gear 32, the gear 32 has been rotated another 90°, and point C on the periphery of gear 32 is translating downwardly at a relatively slow rate compared to the relatively large upward translation of point A. Again, this can be accounted for by the fact that the lever arm between point 34 and point A is much greater than the lever arm between point 34 and point C. A similar condition exists for gear 35, insofar as point D is now translating downwardly at a much higher rate than point B of FIG. 3. Thus, FIG. 5 corresponds to a period of maximum velocity of chain 31. Although the translational and rotational movements of gears 32 and 35 are always additive with the rotational movement of chain 31, the translational component is much larger than previously occurred in FIGS. 3 and 4. Thus, FIG. 5 represents a maximum speed of rotation for element 22, which would correspond to the time at which neither sign face 1 or sign face 2 would be in view. Note that although gear 32, for example, is rotated an additional 90°, sign element 22 has now rotated an additional 40° to 50°. Thus, while the sign element 22 is halfway through its rotation cycle of 120°, the majority of that rotation has occurred during the latter 90° rotation of gear 32.

Figure 6:
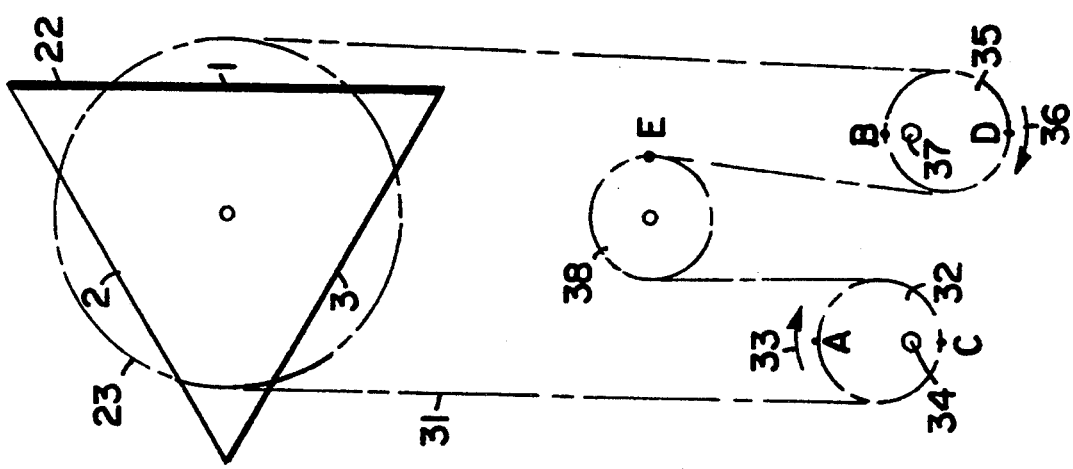
FIG. 6 is a schematic plan view of the device depicted in FIG. 1 shown in a fourth position.

Referring to FIG. 6, chain 31 begins its transition from maximum to minimum speed, with FIG. 6 representing the mirror image of the gear arrangement pictured in FIG. 4. Note that sign element 22 has rotated an additional 40°-50° making for a total rotation of approximately 100° during 270° of rotation for gear 32.

Finally, as seen in FIG. 7, the gears have returned to the position of minimum speed as shown in FIG. 3, and the sign element has completed 120° of rotation which represents one complete 360° cycle of the gear 32, 35, 38 drive arrangement. Since sign element 22 has rotated only 120°, there has occurred a corresponding shift from the display of sign face 1 to the display of sign face 2. Two more complete gear rotation cycles are required in order to display sign face 3 and then ultimately return to the display of sign face 1. Note that during the transition from the position of sign element 22 in FIG. 6 to that of FIG. 7, sign element 22 has rotated only approximately 10°-20°, corresponding to a low velocity and hence low torque and brake requirement for gear 32, even if gear 32 is being driven a constant speed. Again, the motor (not shown) driving gear 32 could be stopped at the position shown in FIG. 7, or the voltage reduced in the case of a variable speed motor.

Referring to FIG. 8, a complete sign is shown, made up of individual panels 22, 47, 48, 49, 50 and 51. An individual drive assembly 21, 21a, etc., is cooperatively attached to each sign element 22, 47, etc., and they are turned in unison to provide the display of a complete sign message. Typically, the drive gear 32, 32a, etc., would be cooperatively connected to a single motor or driving force.

While the invention has been particularly shown and described with reference to a preferred embodiment, it should be understood by those skilled in the art that various changes in form and detail may be made therein without departing from the spirit and scope of the invention. Consequently, the invention can be practiced otherwise than as specifically described herein.

The embodiments of the invention in which an exclusive property or privilege is claimed are defined as follows.

I claim:
1. A convertible sign mechanism, comprising:
 (a) a convertible sign member, said convertible sign member being rotatable about an axis thereof; and
 (b) drive means for rotating said convertible sign member at a variable velocity, said drive means operating continuously throughout the rotation of said convertible sign member, wherein said drive means includes:
  (i) a motor, said motor having a shaft rotatably mounted thereon; and
  (ii) a drive gear having a symmetrical center axis, said drive gear being operatively connected to said shaft about a drive axis, said drive axis being parallel to and offset from said symmetrical center axis, whereby said drive gear rotates eccentrically about said shaft.

2. The convertible sign display mechanism of claim 1, wherein said convertible sign member is rotatable about a longitudinal axis, and wherein said convertible sign member comprises first and second display faces disposed about said longitudinal axis, said first and second display faces being displayable at first and second rotational positions, respectively.

3. The convertible sign display mechanism of claim 2, wherein said drive means rotates said convertible sign member at a minimum rotation velocity proximate said first and second rotational positions, and rotates said convertible sign member at a maximum rotational velocity at an intermediate rotational position between said first and second rotational positions.

4. The convertible sign display mechanism of claim 2, wherein the rotational velocity of said convertible sign member increases between said first and intermediate rotational positions and decreases between said intermediate and second rotational positions.

5. The convertible signal display mechanism of claim 4, wherein said convertible sign member further comprises at least one additional display face disposed about said longitudinal axis, each of said additional display faces being displayable at an additional rotational position corresponding to each of said additional display faces, and wherein said first, second and additional rotational positions are spaced substantially equidistant from one another.

6. The convertible sign display mechanism of claim 1, further comprising:
 (a) a sign gear operatively connected to said convertible sign member so as to rotate cooperatively with said convertible sign member;
 (b) a chain, operatively connected between said drive gear and said sign gear, for transferring rotational power from said drive gear to said sign gear; and
 (c) tension means, operatively connected to said chain between said drive and sign gears, for maintaining tension in said chain.

7. The convertible sign display mechanism of claim 4, wherein said tension means comprises an equalizer gear, said equalizer gear being eccentrically rotatable such that variations in tension within said chain caused by the rotation of said drive gear are substantially nullified.

8. The convertible sign display mechanism of claim 4, further comprising an idler gear operatively connected to said chain between said drive and equalizer gears.

9. The convertible sign display mechanism of claim 5, wherein said sign, drive, equalizer and idler gears are substantially coplanar.

10. The convertible sign display mechanism of claim 1, wherein said motor operates at a substantially constant rotational velocity.

11. A convertible sign display mechanism comprising:
 (a) a convertible sign member, said convertible sign member being rotatable about an axis thereof;
 (b) a sign gear operatively connected to said convertible sign member so as to rotate cooperatively with said convertible sign member;
 (c) a motor, said motor having a shaft rotatably mounted thereon;

(d) a drive gear having a symmetrical center axis, said drive gear being operatively connected to said shaft about a drive axis, said drive axis being parallel and offset from said symmetrical center axis, whereby said drive gear rotates eccentrically; and
(e) a chain, operatively connected between said drive gear and said sign gear, for transferring rotational power from said drive gear to said sign gear.

12. The convertible sign display mechanism of claim 11, further comprising an equalizer gear, operatively connected to said chain between said drive and sign gears, said equalizer gear being eccentrically rotatable such that variations in tension within said chain caused by the rotation of said rive gear are substantially nullified.

13. The convertible sign display mechanism of claim 12, further comprising an idler gear operatively connected to said chain between said drive and equalizer gears, and wherein said sign, drive, equalizer and idler gears are substantially coplanar.

* * * * *